United States Patent [19]
Ortega

[11] 4,365,366
[45] Dec. 28, 1982

[54] THREE PORT VALVE WITH DRAIN PASSAGE

[75] Inventor: Robert Ortega, Rancho Mirage, Calif.

[73] Assignee: Purex Corporation, Lakewood, Calif.

[21] Appl. No.: 218,486

[22] Filed: Dec. 22, 1980

Related U.S. Application Data

[62] Division of Ser. No. 116,033, Jan. 28, 1980, Pat. No. 4,278,109.

[51] Int. Cl.³ .......................... E04H 3/16; E04H 3/18
[52] U.S. Cl. .......................................... 4/493; 4/507; 4/509; 4/508; 137/625.25; 137/625.43; 137/625.47
[58] Field of Search ................... 4/490, 492, 493, 506, 4/507, 508, 509; 137/625.25, 625.47, 625.43, 876, 625.41, 625.17; 251/310, DIG. 1, 309, 30

[56] References Cited

U.S. PATENT DOCUMENTS

| | | | |
|---|---|---|---|
| 3,191,628 | 6/1965 | Kirkwood et al. | 137/625.25 |
| 3,536,100 | 10/1970 | Marlow et al. | 137/625.47 |
| 3,938,553 | 2/1976 | Ortega | 137/625.43 X |
| 4,169,491 | 10/1979 | Bajka | 137/625.47 |
| 4,185,333 | 1/1980 | Ortega | 4/508 |
| 4,286,625 | 9/1981 | Tomlin et al. | 137/625.43 |

*Primary Examiner*—Henry K. Artis
*Attorney, Agent, or Firm*—William W. Haefliger

[57] ABSTRACT

A valve has a body with multiple openings and a rotary valve member rotatable in a body cavity to control flow through the openings. A fixed closure member extends over one of the body openings, and a valve member control extends through the closure. A drain passage has a first portion in the fixed closure and a second portion in the rotary valve member. Those portions are brought into registration when the rotary member is in one position of flow control.

8 Claims, 1 Drawing Figure

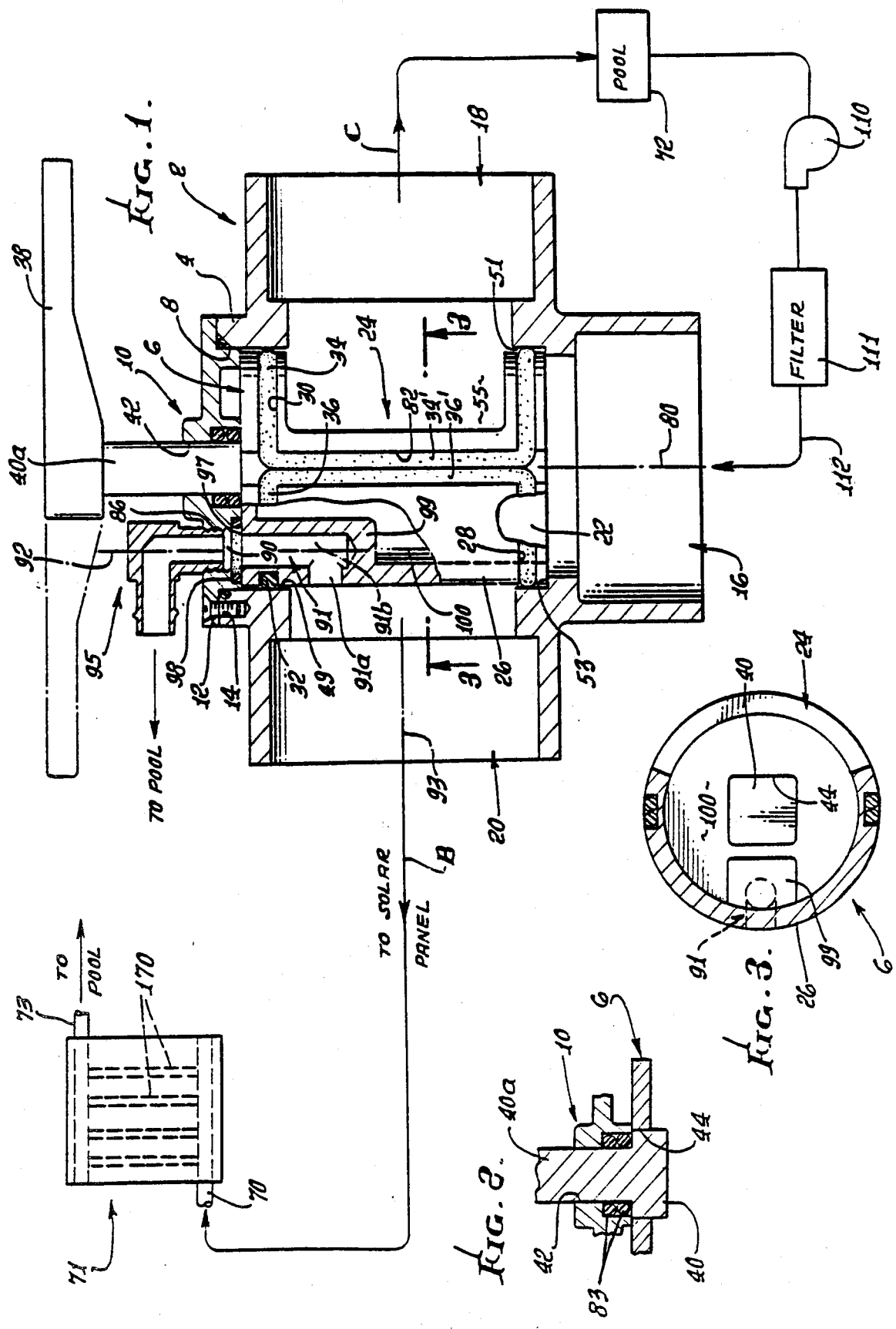

THREE PORT VALVE WITH DRAIN PASSAGE

This is a division of application Ser. No. 116,033, filed Jan. 28, 1980, now U.S. Pat. No. 4,278,109.

BACKGROUND OF THE INVENTION

This invention relates generally to valves, and more particularly concerns a valve of the type described in U.S. Pat. No. 3,938,553 and in which a drain passage of highly unusual construction and function is incorporated.

There are times when valves as shown in the above mentioned patent are connected with solar panels or heating equipment for heating liquid such as water flowing to a pool or other water body. It is desired that water in the solar heating equipment be drained when the equipment is not in use, as otherwise such water in the equipment might boil in the daytime, or freeze at night. While an additional drain valve may be employed to drain the solar heating equipment, the user may forget to open that valve to drain position when necessary; also the drain valve represents added costs. Attempts to resolve this problem have included valve designs as in U.S. Pat. No. 4,169,491; however, the incorporation of drainage as shown in that patent necessitates a major re-design of the basic valve itself, which is costly and otherwise objectionable.

SUMMARY OF THE INVENTION

It is a major object of the present invention to provide a drain passage in the highly efficient and desirable valve of the type shown in U.S. Pat. No. 3,938,553, and which does not require modifications of the valve body or seals. That valve is characterized by:

(a) a valve body having a cavity, and first, second and third openings communicating with that cavity, (b) a rotary valve member in the cavity, the valve member having a generally cylindrical exterior surface and an internal hollow with an end opening in alignment with that first opening, (c) the valve member having a side opening positioned at substantially a right angle with respect to said end opening, the valve member being rotatable to bring the side opening into or out of alignment with said second opening or said third opening so as to establish flow communication between the first and second openings, or between the first and third openings, via the end and side openings in the valve member, (d) the valve body having an additional opening and located generally in alignment with that first opening, and (e) there being a removable closure member on the valve body and extending over said additional opening, and means for rotating the valve member, said means extending through the closure member.

The present invention improves the above, by adding a drain passage having a first portion in the closure and a second portion in the rotary valve member, said portions being brought into endwise communication when the side opening in the rotary valve member is in alignment with one of said second and third openings.

As will be seen, the drain passage second portion may have simple, L-shape configuration defined by a first leg opening to the side of the valve member, or diverter, opposite to the side opening in the latter, and a second leg opening to the end of the valve member which faces toward the closure; the valve member may simply have an added interior boss containing the two legs of the drain passage second portion; and the two legs are everywhere spaced from seals between the exterior of the valve member and a bore in the valve body, whereby such latter seals and the valve body are not disturbed.

These and other objects and advantages of the invention, as well as the details of an illustrative embodiment, will be more fully understood from the following description and drawings in which:

DRAWING DESCRIPTION

FIG. 1 is a side elevation showing a valve in a system that includes a solar panel and a pool; and FIG. 2 is a fragmentary elevation showing a construction detail of the FIG. 1 valve; and FIG. 3 is a section taken on lines 3—3 of FIG. 1.

DETAILED DESCRIPTION

Turning to FIG. 1, a valve 2 includes a valve body 4 with a valve member or diverter 6 retained within the body. The valve member 6, which is of a hollow, generally cylindrical construction, may be inserted within the valve body 4 through a valve body opening 8. After insertion of the valve member 6 within the valve body 4, the valve member is retained within the body by a removable closure 10. The closure 10 may be secured to the valve body 4 through any convenient means such as screws 12 which pass through apertures in the closure and engage threaded openings 14 in the valve body.

The valve body 4 includes a first opening 16, a second opening 18, and a third opening 20. The valve member 6 includes a side opening 24 and an end opening 22 in alignment with the first opening 16. On rotation of valve member 6 within the valve body 4, the side opening 24 may be brought into or out of alignment with either the second opening 18 or third opening 20. With side opening 24 in alignment with the third opening 20, liquid may flow through the valve 2 in the direction of the arrows denoted B. Liquid entering the first opening 16 may thus flow through end opening 22, side opening 24 and be discharged through the third opening 20 to lower manifold 70 of solar panel 71. Liquid flows through the panel and is heated therein, and then flows to pool 72 via manifold 73. Ducts 170 connect manifolds 70 and 73.

On rotation of valve member 6 from its position indicated in FIG. 1, the side opening 24 may be brought into alignment with the second opening 18. With valve member 6 in this position, liquid may flow through the valve 2 in the direction indicated by arrows C with liquid entering through first opening 16, flowing through openings 22 and 24 in valve member 6, and being discharged through second opening 18. Such liquid (as for example water) flows directly to the pool.

The valve member 6 includes a cylindrical surface 26 which may be positioned opposite the side opening 24. Thus, when side opening 24 is in alignment with the third opening 20, the flow of liquid through second opening 18 is blocked by the surface 26. Conversely, when side opening 24 is in alignment with second opening 18, the flow of liquid through the third opening 20 is blocked by surface 26.

In forming a seal between the valve member 6 and valve body 4, a first groove 28, a second groove 30, and a third groove 32 may be formed in the exterior cylindrical surface of the valve member. As indicated, the first groove 28 surrounds end opening 22 in the valve member 6. Similarly, second groove 30 surrounds the side opening 24 while third groove 32 is positioned to surround either the second opening 18 or third opening 20 depending upon the position of the valve member 6.

The grooves 28, 30 and 32 have certain portions which are in common. Thus, the portion of second groove 30 which is positioned transverse to the axis 80 of valve member 6 adjacent the end opening 22 is common to the first groove 28. Similarly, the transverse portion of third groove 32 adjacent the end opening 22 is common to first groove 28. The portions of second groove 30 and third groove 32 which are parallel to the axis of the valve member 6 are joined with the joined portions being common to both second groove 30 and third groove 32.

A first continuous seal member 34 is positioned within second groove 30 and a second continuous seal member 36 is positioned within third groove 32. Due to the construction of grooves 28, 30 and 32, the portion of the seal member 34 which lies in groove 28 performs a dual function in serving to maintain a positive seal about end opening 22 and also about side opening 24. Similarly, the portion of the seal member 36 which lies in the first groove 28 performs a dual function in providing a seal about end opening 22 and about second opening 18 or third opening 20 depending upon the position of valve member 6 within the valve body 4.

The portions 34' and 36' of the first and second seal members 34 and 36 which are in juxtaposition in the common region 82 (which extends longitudinally) where grooves 30 and 32 are joined also perform a dual function. In the common region, the seal members 34 and 36 reinforce each other so as to form a double seal between second opening 18 and third opening 20.

To provide rotation of valve member 6 within valve body 4, a handle 38 may be provided within the handle connected to a crank end 40 on a stem 40a which extends through an aperture 42 in the closure 10 to engage a crank opening 44 in the valve member. With the crank end 40 in engagement with crank opening 44, as indicated in FIG. 2, rotational movement of crank end 40 will, in turn, cause rotational movement of valve member 6. Note seals 83 between stem 40a and closure 10.

With the valve member 6 positioned within valve body 4, the exterior cylindrical surface of the valve member is positioned closely adjacent a cylindrical surface 49 defined by valve body opening 8 and also adjacent an upstanding cylindrical support surface 51 adjacent first opening 16. The upper end surface of valve member 6 also lies closely adjacent to the undersurface of closure 10 while the lower end surface of the valve member slidably engages a support surface 53 positioned adjacent opening 16.

With the valve member 6 positioned as shown in FIG. 1, the portions of seal members 34 and 36 which lie in planes transverse to the axis 80 of the valve member are in contact with either cylindrical surface 49 or cylindrical surface 51. A partial cylindrical surface 55 formed within the valve body 4 is positioned closely adjacent the outer surface of the valve member 6. Contact of the seal members 34 and 36 with surface 55 provide a positive seal about the side opening 24 and a positive seal between the second opening 18 and third opening 20.

In accordance with an important aspect of the invention, a drain passage is provided to drain liquid (such as water) from the solar panel or panels when valve member side opening 24 is in the position shown in FIG. 1.

That drain passage typically includes a first portion 90 through the closure 10, and a second portion 91 in the valve member, those portions being brought into endwise inter-communication (along an axis 92 at right angles to lateral axis 93 through openings 18 and 20) when the valve member side opening 24 is in coaxial alignment or registration with one of the openings 18 and 20 (i.e. opening 18 in the case of FIG. 1). Note that handle 38 points in the outward facing direction of side opening 24, so that it can be easily aligned with either opening 18 or 20. An elbow fitting 95 is shown attached at 86 to the closure 10 to conduct liquid from drain passage portion 90.

Drain passage second portion 91 is typically L-shaped and has a first leg 91a opening to the outerside of the valve member surface 26 opposite the side opening 24, and a second leg 91b opening to the end 97 of the valve member which faces toward closure 10. An annular seal 98 in a groove in the closure seals off between the end 97 and the closure, and extends about the drain passage, in the position shown in FIG. 1. When the valve member is rotated 180°, to its alternate position, no liquid can escape to drain passage portion 90, since second portion 91 is then rotated out of communication with portion 90 and the seal remains in sealing engagement with the flat top of the valve member. Note that this construction does not disturb seal 36, since drain passage portions 90 and 91 are everywhere spaced from seal 36, whereby desired simplicity of construction is achieved, while a drain passage and its function are included.

The valve member has an interior boss 99 exposed to the otherwise hollow interior 100 of the valve member, that boss containing the first and second legs 91a and 91b, which may be simply formed as drilled openings that intersect in the boss.

If desired, stops may be incorporated in the valve, to limit valve member rotation in its FIG. 1 position, and 180° therefrom, as described in U.S. Pat. No. 3,938,553.

In operation, the valve member in FIG. 1 position diverts water or liquid entering port 16 to exit port 18 and flow to pool 72. At this time, water in solar panel 71 can drain via drain passage portions 91 and 90 to the pool. When rotated 180°, the diverter causes entering water to flow to the solar panel to be heated, and then to the pool, as shown.

The valve body closure, and valve member may consist of plastic (such as PVC for example) or metal (such as brass, for example).

Pump and filter elements are shown at 110 and 111, in a line 112 extending from pool 72 to inlet 16.

I claim:
1. A system that comprises, in combination:
   (a) a valve body having a cavity, and first, second and third openings communicating with said cavity,
   (b) a rotary valve member in said cavity, said valve member having a generally cylindrical exterior surface and an internal hollow with an end opening in alignment with said first opening,
   (c) the valve member having a side opening positioned at substantially a right angle with respect to said end opening, the valve member being rotatable to bring the side opening into or out of alignment with said second opening or said third opening so as to establish flow communication between the first and second openings, or between the first and third openings, via said end and side openings in the valve member,

(d) the valve body having an additional opening and located generally in alignment with said first opening, (e) there being a removable closure member on the valve body and extending over said additional opening, and means for rotating the valve member, said means extending through the closure member, (f) a drain passage having a first portion in the closure and a second portion in the rotary valve member, said portions being brought into endwise communication when the side opening in the rotary valve member is in alignment with one of said second and third openings, and (g) a solar panel connected in series with said drain passage via one of said second and third openings.

2. The valve of claim 1 and including a pool connected via ducting with the other of said second and third openings.

3. A system that comprises, in combination:

(a) a valve body having a cavity, and first, second and third openings communicating with said cavity, (b) a rotary valve member in said cavity, said valve member having a generally cylindrical exterior surface and an internal hollow with an end opening in alignment with said first opening, (c) the valve member having a side opening positioned at substantially a right angle with respect to said end opening, the valve member being rotatable to bring the side opening into or out of alignment with said second opening or said third opening so as to establish flow communication between the first and second openings, or between the first and third openings, via said end and side openings in the valve member, (d) the valve body having an additional opening and located generally in alignment with said first opening, (e) there being a removable closure member on the valve body and extending over said additional opening, and means for rotating the valve member, said means extending through the closure member, (f) a drain passage having a first portion in the closure and a second portion in the rotary valve member, said portions being brought into endwise communication when the side opening in the rotary valve member is in alignment with one of said second and third openings, and (g) a pool connected in series with said drain passage.

4. The valve of claim 1 wherein said drain passage second portion is L-shaped and has a first leg opening to the outer side of said valve member opposite said side opening, and a second leg opening to the end of said valve member which faces toward said closure.

5. The valve of claim 4 wherein said valve member has an interior boss exposed to said hollow, said boss containing said first and second legs of the drain passage second portion.

6. The valve of claim 1 including seal means sealing off between said closure and said valve member extending about one of said first and second portions of the drain passage when said first and second portions are in endwise communication.

7. The valve of claim 6 wherein said closure defines an annular recess, said seal means being annular and received in said recess.

8. The valve of claim 4 including other seal means extending about the exterior surface of the valve member and sealing off between the valve member and said valve body, said other seal means also extending about said second leg of the drain passage second portion and everywhere spaced therefrom.

* * * * *